No. 688,928. Patented Dec. 17, 1901.
H. BURG.
APPARATUS FOR PROVISIONALLY SEPARATING LINES OF TYPE OR MATRICES.
(Application filed May 14, 1898.)
(No Model.) 6 Sheets—Sheet 1.
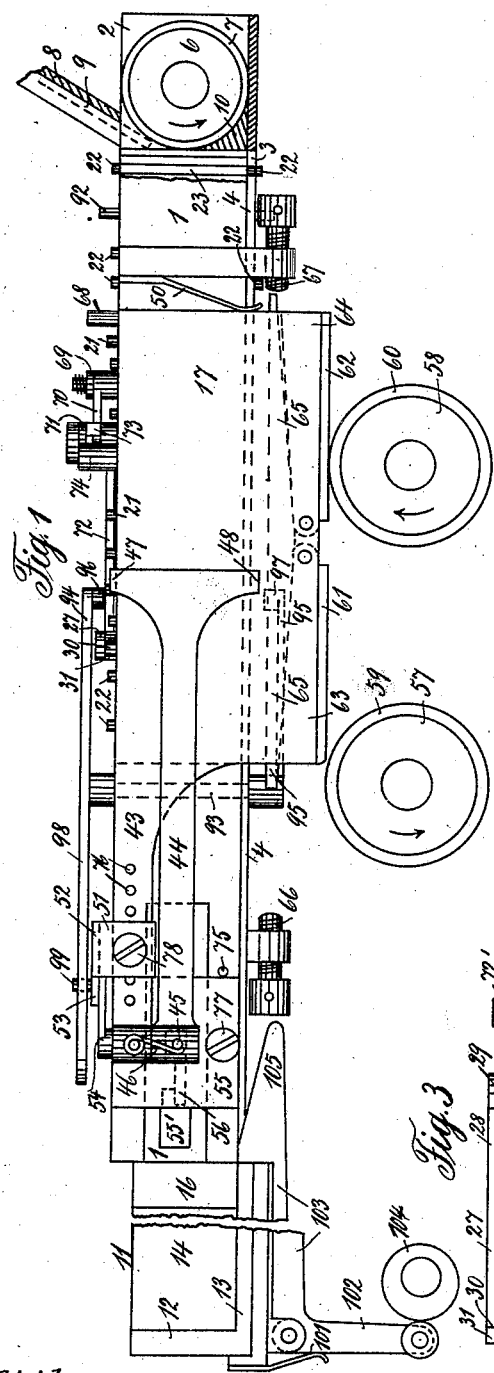
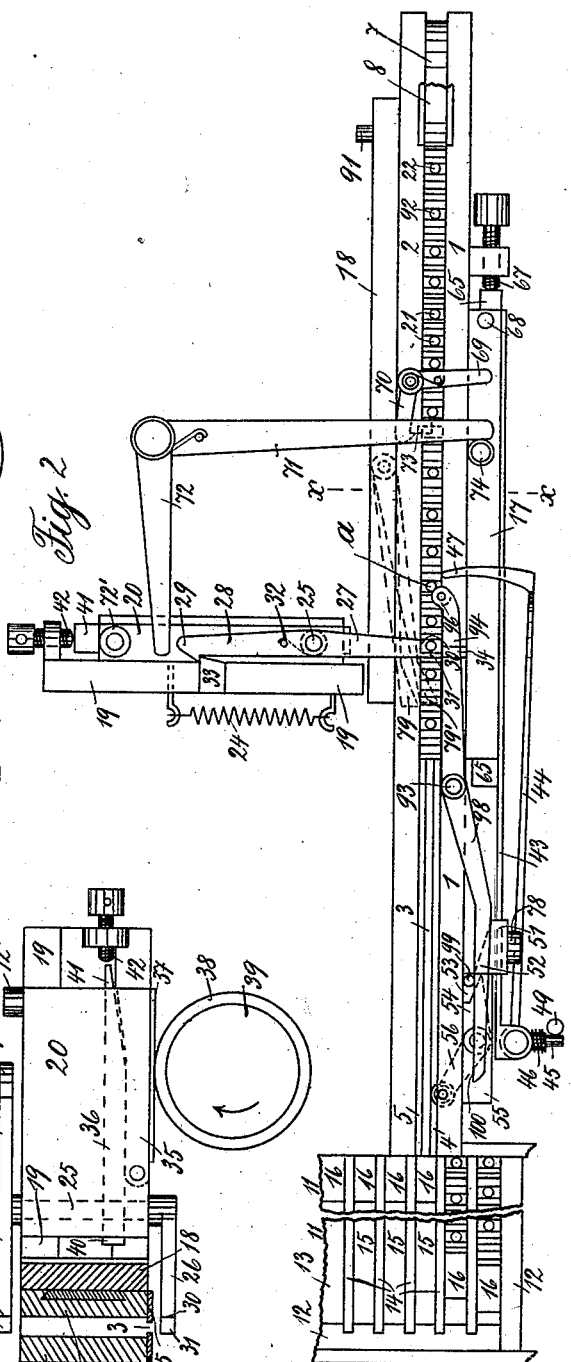
Witnesses
Helen L. Stoddard
William E. Neff
Inventor
Hubert Burg
By J. H. Watson, atty.

No. 688,928. Patented Dec. 17, 1901.
H. BURG.
APPARATUS FOR PROVISIONALLY SEPARATING LINES OF TYPE OR MATRICES.
(Application filed May 14, 1898.)
(No Model.) 6 Sheets—Sheet 2.
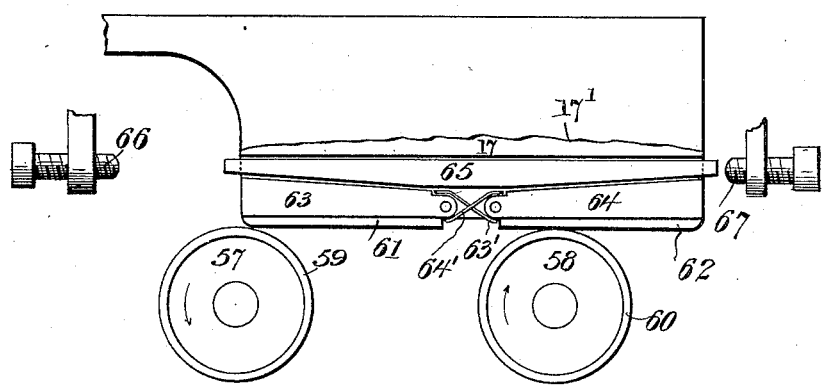
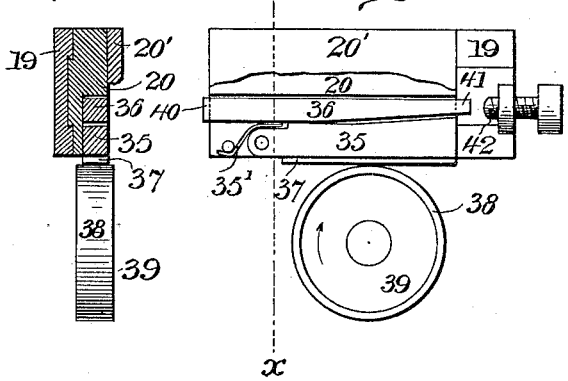

No. 688,928. Patented Dec. 17, 1901.
H. BURG.
APPARATUS FOR PROVISIONALLY SEPARATING LINES OF TYPE OR MATRICES.
(Application filed May 14, 1898.)
(No Model.) 6 Sheets—Sheet 3.
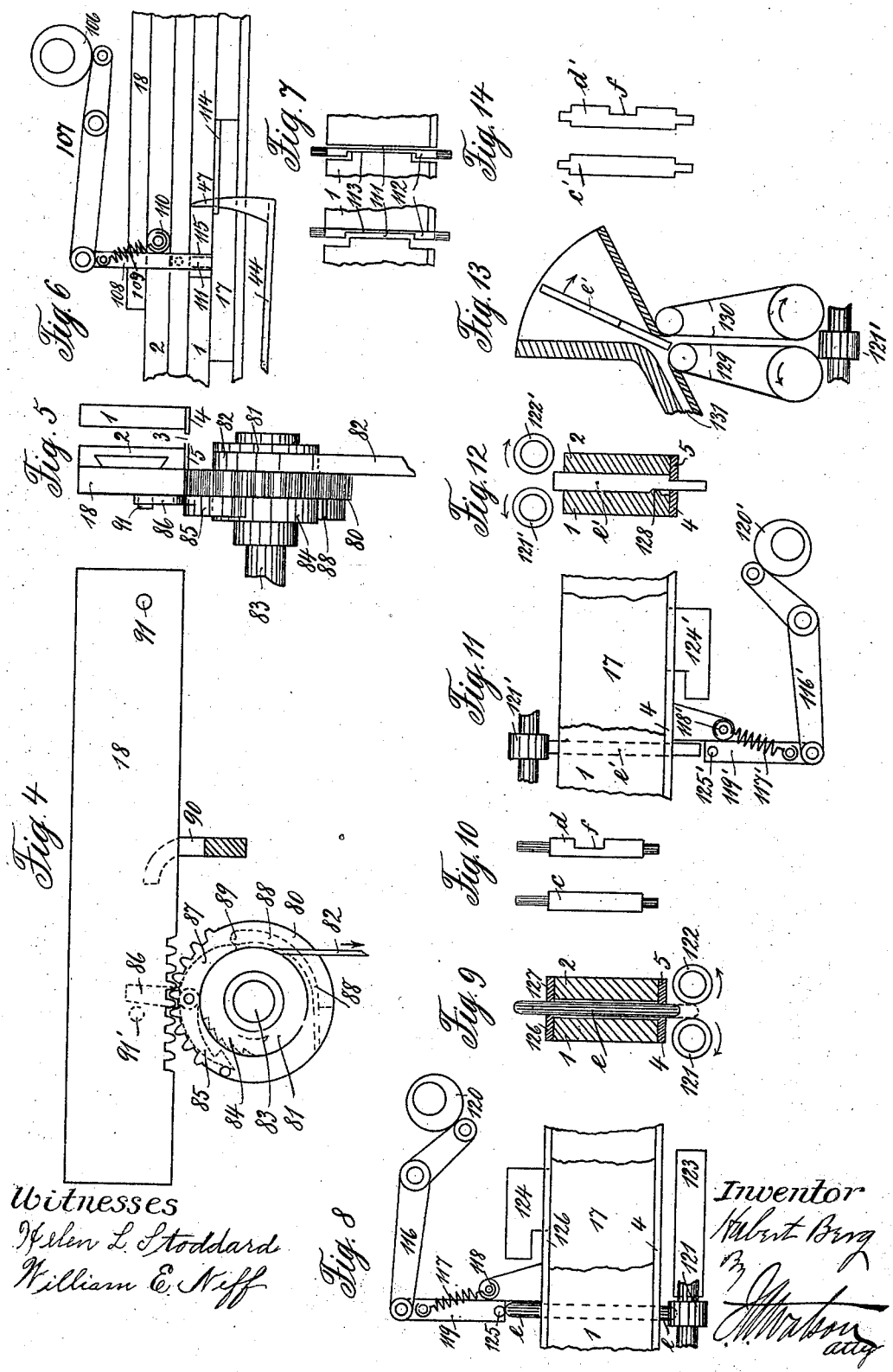
Witnesses
Helen L. Stoddard
William E. Neff
Inventor
Hubert Burg No. 688,928. Patented Dec. 17, 1901.
H. BURG.
APPARATUS FOR PROVISIONALLY SEPARATING LINES OF TYPE OR MATRICES.
(Application filed May 14, 1898.)
(No Model.) 6 Sheets—Sheet 4.
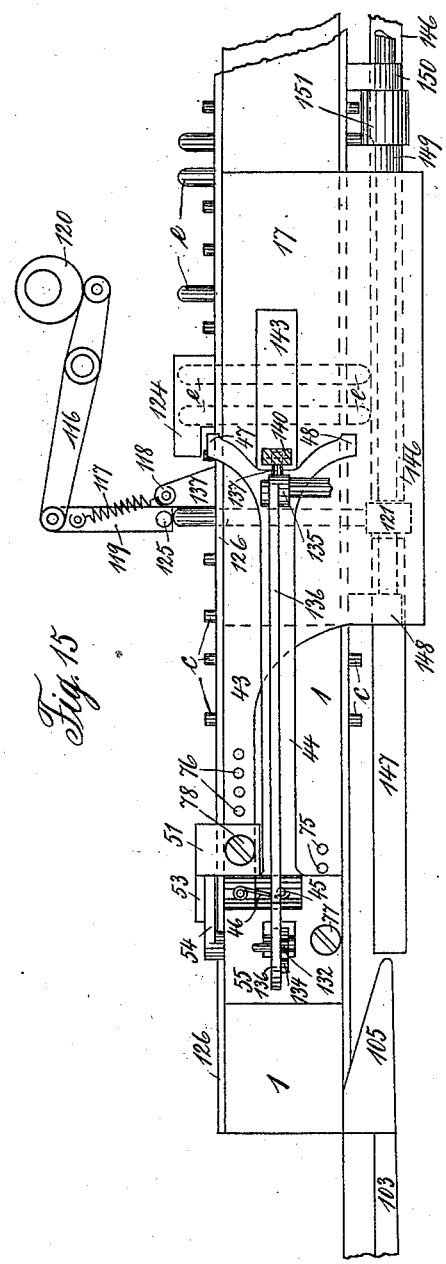
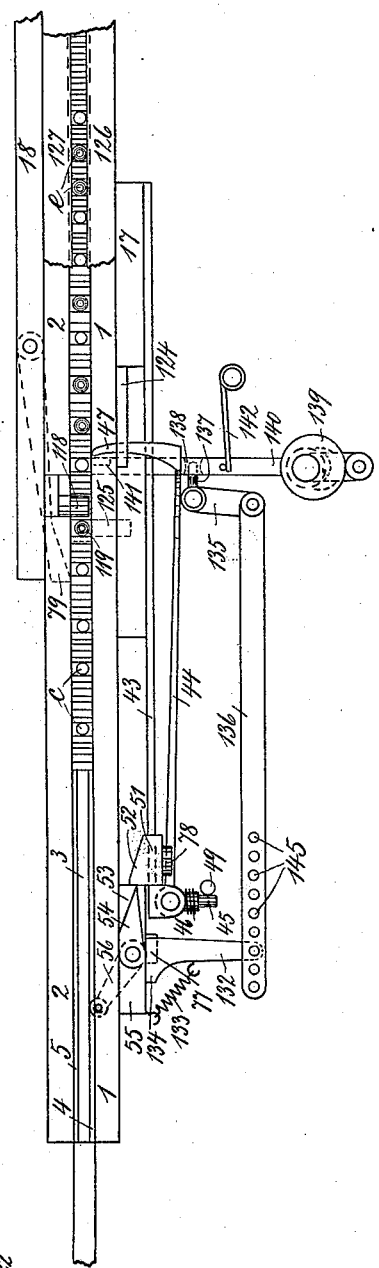
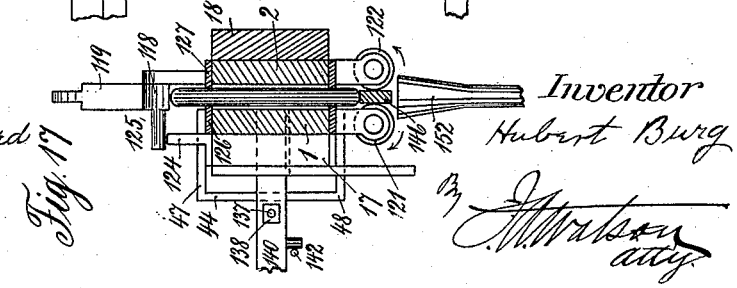
Witnesses
Helen L. Stoddard
William E. Neff
Inventor
Hubert Burg
by J. W. Watson
atty No. 688,928. Patented Dec. 17, 1901.
H. BURG.
APPARATUS FOR PROVISIONALLY SEPARATING LINES OF TYPE OR MATRICES.
(Application filed May 14, 1898.)
(No Model.) 6 Sheets—Sheet 5.
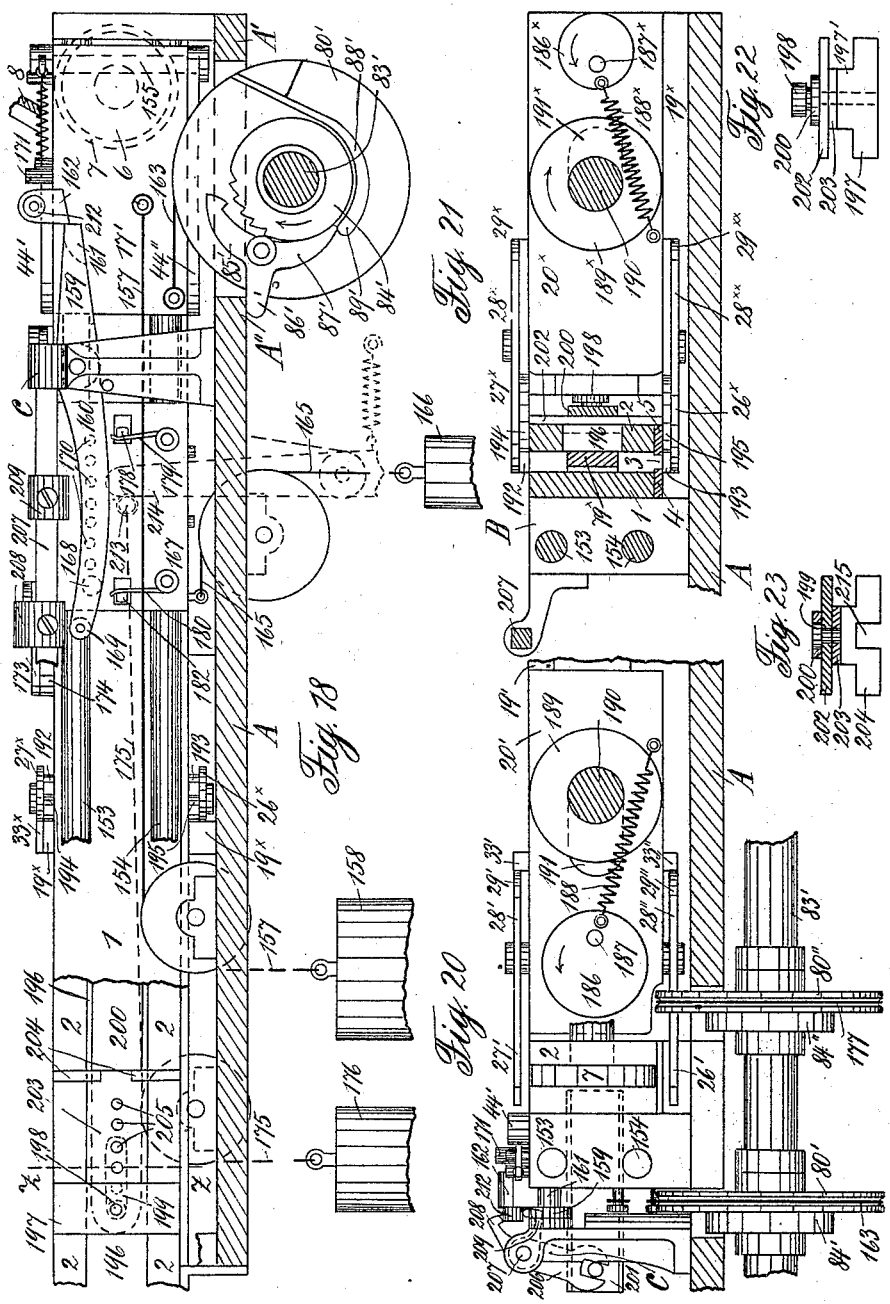
Witnesses
Helen L. Stoddard
William E. Neff
Inventor
Hubert Burg
By J. H. Watson, atty.

No. 688,928. Patented Dec. 17, 1901.
H. BURG.
APPARATUS FOR PROVISIONALLY SEPARATING LINES OF TYPE OR MATRICES.
(Application filed May 14, 1898.)
(No Model.) 6 Sheets—Sheet 6.
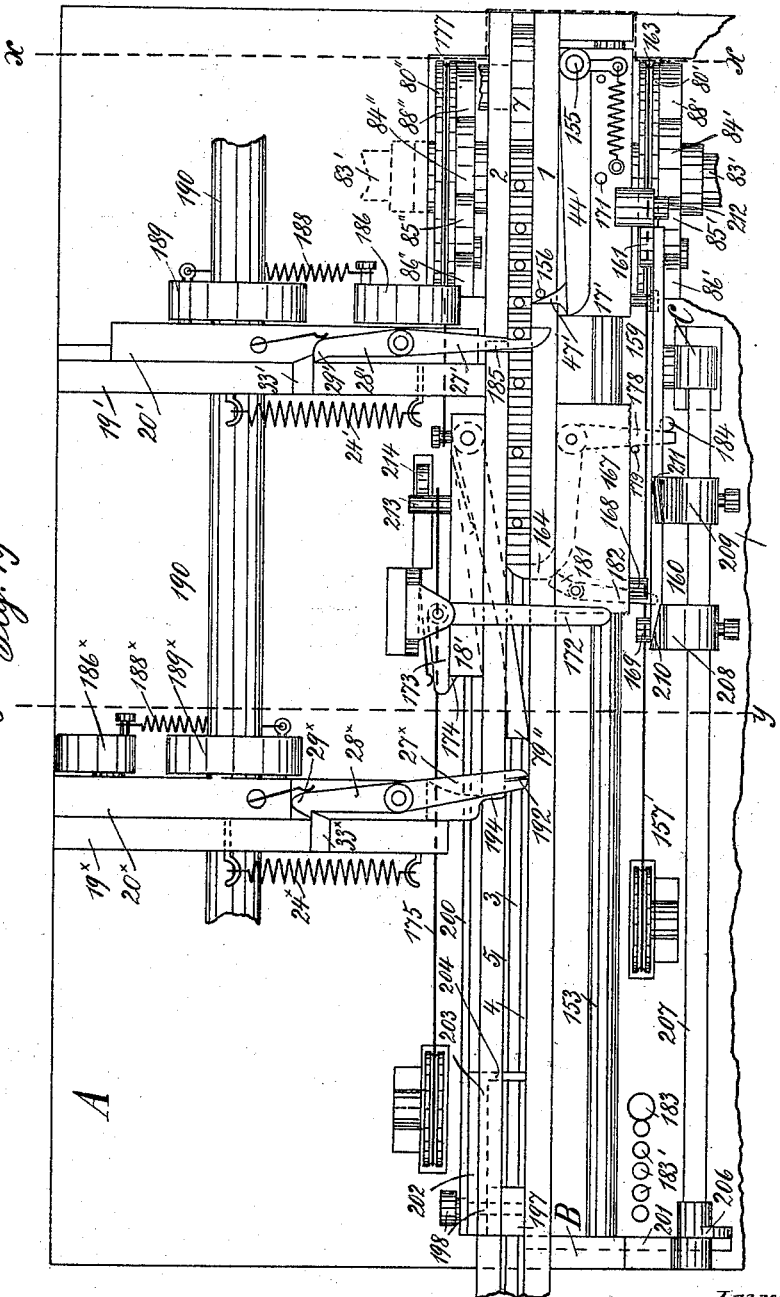

UNITED STATES PATENT OFFICE.

HUBERT BURG, OF MOLLKIRCH, GERMANY.

APPARATUS FOR PROVISIONALLY SEPARATING LINES OF TYPE OR MATRICES.

SPECIFICATION forming part of Letters Patent No. 688,928, dated December 17, 1901.

Application filed May 14, 1898. Serial No. 680,699. (No model.)

*To all whom it may concern:*

Be it known that I, HUBERT BURG, a subject of the German Emperor, residing at Mollkirch, near Rosheim, Alsace, Germany, have invented a new and useful Apparatus for Provisionally Separating Lines of Type or Matrices, of which the following is a specification.

The objects of my invention are to provide an apparatus in which, first, the detaching of provisional lines is performed automatically; second, the detaching of the said lines is controlled exclusively by the endless line itself as it proceeds when being composed, and, third, in which it will be possible to form paragraphs by detaching lines of any length required to end the paragraph with the predetermined word.

The general object of my invention is the formation of provisional unjustified lines ending with a full word or with a syllable, and approaching as near as possible to the length required, which lines may afterward be justified by hand or by a justifying apparatus to bring them to the required length. The type may be assembled into a uniform endless line by hand or by a setting-machine, the latter being controlled by an operator or quite automatically by a register provided with marks, by a perforated strip, or in any other well-known manner. Perforated strips have been provided with special holes for dividing the type into lines as well as for justifying the same in order to control the formation of definitive justified lines of a predetermined length, and lines of no other length can be composed by the action of the said strip nor corrections made without changing at the same time the line breaking and the justifying holes. My apparatus entirely dispenses with these inconveniences when using a perforated strip for composing types, as the strip for my purposes does not need line breaking nor justifying holes and any corrections can be locally made by simply cutting out or pasting over the words to be removed, and by simply inserting a portion of strip containing any words omitted, no regard to be had for any other portion of the strip. When using a perforated strip, I provide the same with perforations for character-types, for provisional spaces, and for provisional hyphen-types between the syllables of words. As concerning the latter it is not always necessary to provide on the strip perforations for hyphen-types between each two syllables, but it will generally suffice to provide such perforations between somewhat long syllables and to omit perforations between two consecutive short syllables. In the case of paragraphs I further provide the strip with perforations for special types hereinafter called "end" types. When composing the endless line by hand or by means of a keyboard, spaces, hyphen-types, and, if required, end types are to be set at proper places in the endless line.

My invention therefore involves an endless line of type or matrices containing at proper places provisional spaces, provisional hyphen-types, and end types, if required, no matter whether the endless line is composed by hand, by means of a keyboard, or quite automatically by means of a register.

It further consists in successively removing afterward the provisional hyphen-types from the endless line, beginning from its forward end, in successively detaching therefrom after a space or a hyphen-type individual lines of a given length as nearly as possible, and in retaining in a line one hyphen-type in case the said line has been detached after that hyphen-type, the detaching being controlled and performed by the forward movement of the endless line itself or by the end type in the case of paragraphs.

My invention will be fully understood from the following description of the apparatus for carrying out the same and represented in the accompanying drawings, in which—

Figure 1 is a side view of such an apparatus. Fig. 1ª is a detail view of a portion of the mechanism shown in Fig. 1; Fig. 2, a top view; and Figs. 3, 3ª, 3ᵇ, (which is a section on the line $x\ x$ of Fig. 3ª,) 4, and 5, inclusive, detail views thereof. Figs. 6 and 7 illustrate a modification of some of the devices shown in Figs. 1 and 2. Figs. 8 and 9 illustrate another modification of the invention shown in Figs. 1 and 2. Fig. 10 illustrates a space and an end type adapted for use with the devices shown in Figs. 8 and 9. Figs. 11, 12, and 14 are views corresponding to Figs. 8, 9, and 10, respectively, illustrating another modification. Fig. 13 illustrates a device for receiving the types ejected from the line by the devices illustrated in Figs. 11 and 12. Figs. 15, 16, and 17 are views of another form of the invention corresponding, respectively, to Figs. 1, 2, and 3. Figs. 18 and 19 are side and plan views, respectively, of another modified form of the invention. Figs. 20 and 21 are sectional views taken on the lines $xx$ and $yy$ of Fig. 19. Fig. 22 is a rear view of the devices shown in Figs. 20 and 21, and Fig. 23 is a sectional view taken on the line $zz$ of Fig. 18.

Referring first to Figs. 1 to 5, the endless line is assembled in a channel consisting of two walls 1 2 and a bottom 4 5, Fig. 3, longitudinally slotted at 3 by means of a revolving disk 6, provided with a rubbing-surface 7, the several types 9 being supplied by an inclined channel 8 and set up by the disk and by means of an abutment 10, the free end of the endless line thus proceeding in the assembling-channel. A galley 11 is provided at the left-hand end of the assembling-channel, consisting of a bottom plate 13, carrying walls 12 and partitions 14, forming channels 15 for the reception of the individual detached lines. Channels 15 are closed at the right by movable slide-pieces 16, which are successively shifted toward the left by the entering of the detached lines and on which the free ends of the lines bear. The galley is shifted after the delivery of each line to bring a new channel into position to receive the next line. Slide-pieces 17 and 18 are longitudinally movable on the walls 1 and 2, piece 17 acting to detach the individual lines and shift the same into the path of piece 18, which in its travel toward the left moves said line along with it and delivers the same into the galley. A spring-actuated slide 20 is mounted on piece 19 of the framework in extending in a direction perpendicular to the channel of the endless line, said slide being released by the passing of a hyphen-type to eject the same from the endless line.

In accordance with the rules of typography individual lines cannot be detached except after a space or a hyphen-type, and in order to automatically perform the detaching of the lines, as well as the ejecting of the hyphen-types by means of such types, they must be susceptible of mechanical action. For this purpose I make the said hyphen-types of greater length than the character-types, so that they will project from the line, differentiating too the hyphen-types 21 from the spaces 22, Fig. 1, by making them of greater length. The main body 23 of both is of a rectangular form equal in size to the body of the character-types and provided with pin projections at both ends. All of the types are supported by the bottom 4 5 of the assembling-channel, and the spaces and hyphen-types project downward from said channel, their under pins extending through slot 3.

The ejecting device for the hyphen-types (represented in Fig. 2 in top view and in Fig. 3 in sectional view on line $xx$ of Fig. 2 from the right) is constructed and works as follows: Slide 20 is guided on piece 19 and actuated toward the line by a spring 24. It is provided with a pair of levers 26 27, fixed to the ends of a spindle 25, which is mounted in slide 20, lever 27 forming one piece with a catch-lever 28 29. Levers 26 27 are each provided with a step 30 and with projections 31, entering the path of projections on the hyphen-types 21, but not extending into the path of the lower projections on the spaces 22. Said levers are kept in the positions represented, Fig. 2, by a spring 32, the catch end 29 of lever 28 being engaged and slide 20 thus locked by a tooth 33, fixed to piece 19; but as the line proceeds and the projections of a hyphen-type strike the projections 31 of levers 26 27 catch-lever 28 will be released and slide 20 driven forward by the spring 24, the steps 30 of levers 26 27 engaging the hyphen-type and ejecting the same from the line into a slot 34 of channel-wall 1, from which it drops by gravity and may be delivered to an assembling box or channel. Slide 20 is at once driven back to its normal position and locked by catch 29 and tooth 33 until released again by the following hyphen-type, &c. Slide 20 is driven back to its normal position, Fig. 3, by the following means: A wedge-shaped friction-clutch 35, covered with a rubbing material 37, is pivoted to and a wedge-shaped rod 36 movably mounted in the body of slide 20, and a revolving disk 39, covered likewise with a rubbing material 38, is placed beneath slide 20. In the position of the parts represented in Fig. 3 rod 36 has been shifted toward the left by its end 41 contacting with an adjustable abutment 42, clutch 35 thus being released from rod 36 and slightly raised by a spring 35′, (shown in Fig. 3$^a$,) so that no friction is developed between the rubbing-surfaces 37 38. Slide 20 being released from catch-lever 28 29 is therefore free to strike toward the left. By this movement the end 40 of rod 36 strikes against slide-piece 18 and the rod is shifted toward the right, so as to bring into close contact the rubbing-surfaces 37 38. Slide 20 will therefore at once be driven back to its normal position and caught by catch-lever 28 29, rod 36 at the same time being shifted toward the left by its end 41 striking against the abutment 42 and surfaces 37 38 brought out of contact. As disk 39 revolves very quickly the reciprocating movement of slide 20 is performed almost instantaneously, the latter thus being always in working position whenever a hyphen-type passes by the same. The outer faces of slide 20, rod 36, and clutch-bar 35 are covered by a plate 20′. (Shown most clearly in Figs. 3$^a$ and 3$^b$.)

The detaching of individual lines is effected as follows: Slide-piece 17 is provided with a projecting arm 43, and a lever 44, actuated by a spring 46, is pivoted to the end of arm 43, so that its hook-shaped ends 47 48 will extend into the path of the projecting types of the line, when pin 45, fixed to lever 44, is released from the stop-pin 49 of the framework. In normal position of the parts represented in the drawings slide-piece 17 is held against the pressure of a spring 50, Fig. 1, by an adjustable abutment 51, which is provided with a tooth 52, that engages or bears against a tooth 53 on a lever 54. The latter is mounted on a spindle journaled in an adjustable plate 55, together with a lever 56, projecting with its roller end through a slot 55' of wall 1 into the assembling-channel of the endless line. Levers 54 56 are kept in their normal position by a spring coiled on their spindle. The reciprocating movement of slide-piece 17 is performed by means similar to the means described with reference to slide 20—namely, (see Figs. 1 and 1ª,) revolving disk 57 58, provided with rubbing-surfaces 59 60, wedge-shaped clutches 63 64, having rubbing-surfaces 61 62, and a common rod 65, wedge-shaped at either end and shifted by alternately striking the adjustable abutment 66 67, the clutches 63 64 being lifted against the wedge-shaped faces of bar 65 by springs 63' 64', respectively, and said parts being covered and protected by a face or cover plate 17'. In the drawings rod 65 is shown in its utmost left-hand position, and clutch 63 is depressed, but not into reach of disk 57, and clutch 64 is released, no friction being developed between the surfaces 60 62. If now abutment 52 is released by striking lever 54, as hereinafter described, slide-piece 17 will be moved toward the left by spring 50 and the hook ends 47 48 of lever 44 adjusted into the path of the projecting types. Clutch 63 of slide 17 is then engaged by the disk 57, and said slide is carried toward the left, carrying with it the portion of the line extending from its free end to the first projecting type against which hooks 47 48 strike during the travel of piece 17—i. e., with reference to the example represented in the drawings, Fig. 2, that portion of the line extending from its left-hand end to the hyphen-type a, which in the present instance is the first projecting type struck by hooks 47 48 in their travel. As disk 57 revolves but slowly, any hyphen-types occurring in the portion of the line extending from the ejecting-levers 26 27 to the hooks 47 48 will likewise be ejected during the travel of slide-piece 17 with the single exception of one hyphen-type in case this type should be the last type in the line and be grasped by the hooks 47 48, as supposed in the drawings, Fig. 2, with respect to the hyphen-type a. This is effected by withdrawing from the path of the hyphen-types the projections 31 of the ejecting-levers 26 27 during the passage of hooks 47 48, and is performed by a stud 68 of slide-piece 17 acting on the arm 69 of a two-armed lever, the other catch-arm 70 of which then releases a two-armed lever 71 72, actuated by a strong spring and withdrawing the ejecting-levers by striking with arm 72 against a roller 72' of slide 20. In case the first projecting type grasped by hooks 47 48 happens to be a space the detached line will be obviously ended with that space. The detached individual line will therefore be broken either after a full word or a syllable, as required. When slide 17 reaches its utmost left-hand position, it will be quickly reciprocated toward the right by reach of rod 65, Fig. 1, striking against abutment 66, clutch 63 thus being released and clutch 64 depressed into close contact with disk 58. During the return stroke of slide 17 the hooks 47 48 slip over any projecting types and lever 71 72 is turned back to its normal position by a roller 74 on slide-piece 17 and caught again by catch-lever 69 70. Then as rod 65 strikes against the abutment 67 clutch 64 is released and brought out of contact with disk 58. Slide-piece 17 is therefore stopped and shifted a little distance toward the left by the pressure of the compressed spring 50, but at once caught and retained in its normal position by lever 54, which in the meanwhile has assumed its locking position, with its tooth 53 in front of abutment 52. As above mentioned, slide-piece 17 will be released to perform its function by striking lever 54. This is effected by the proceeding of the endless line in the assembling-channel as soon as its foremost end reaches and strikes lever 56, and in order to detach individual lines of a given length or as near to such length as possible plate 55, carrying levers 54 56 and abutment 51, is so adjusted that the space from the roller end of lever 56 to the hooks 47 48 equals the said length or surpasses the same a distance which can be made up by justifying. For this purpose plate 55 and abutment 51 are provided with set-screws 77 78 and wall 1 of the assembling-channel and arm 43 fitted with screw-holes corresponding to the different lengths of lines.

From the foregoing it will be clear that by means of the hooks 47 48 there are successively detached from the proceeding endless line portions ending with a full word or with a syllable and approaching in length as near as possible to a given length to which all the detached lines can be brought by justification. The said hooks always grasp the first projecting type they reach in their travel toward the left, and the line is therefore always broken after the last word or syllable allowed to enter the line. The lines detached and shifted toward the left by slide-piece 17 are grasped by a pawl 79, pivoted to the slide-piece 18 and entering, in its working position 79', the assembling-channel through a lateral slot. As soon as slide-piece 17 reaches its extreme left-hand position slide-piece 18 will be released and, engaging the line by means of pawl 79, deliver the same to the galley and then return at once to normal position represented in the drawings. This is effected by the means represented, Figs. 4 and 5, the former being a side view and the latter showing a front view of Fig. 4 from the left, the assembling-channel (represented in Fig. 5) being omitted in Fig. 4 for the sake of clearness, as it would cover slide-piece 18. The latter is longitudinally guided on the wall 2 of the assembling-channel, Figs. 2 and 5, and provided with teeth on its lower edge which engage with a toothed wheel 80, loosely mounted on a revolving shaft 83. A pulley 81 is fixed to the toothed wheel and supports a weight-actuated belt 82', and a three-armed pawl 85 86 87, pivoted to wheel 80, engages with a ratchet-wheel 84, fixed to shaft 83. The pawl is actuated by a spring-piece 88, fixed to wheel 80 in such manner that the spring keeps the pawl in position as well when out of engagement with the ratchet-wheel, Fig. 4, as when in engagement therewith. In the latter case edge 89 of spring-piece 88 bears against the extreme edge of lever-arm 87 and faces pawl 85 toward the ratchet-wheel. The contact-surfaces of the edge 89 of said spring-piece and lever 87 are so shaped that by the slightest movement of arm 86 toward the right the end 89 of spring-piece 88 will be deprived of its support, thus grasping arm 87 from its outside and suddenly and fully releasing arm 85 from its engagement with the ratchet-wheel.

Fig. 4 shows the several parts in their normal position. If now slide-piece 17 reaches its extreme left-hand position an arm 90, Fig. 4, projecting laterally from slide-piece 17, strikes lever-arm 86 and brings pawl 85 into engagement with ratchet-wheel 84, wheel 80 will therefore be moved with carrying slide-piece 18 toward the left and raise the weight suspended on belt 82. By this movement a pin 91, fixed to slide-piece 18, is brought to the dotted position 91', and the wheel 80 having performed a complete revolution lever-arm 86 strikes said pin; but the end of the arm 86 moving faster than pin 91' (the speed of the latter corresponding to the speed of the pitch-circle of wheel 80 and the end of arm 86 moving on a larger circle) said arm will be pressed toward the right and arm 85 therefore suddenly brought out of engagement with ratchet-wheel 84, as heretofore described. In consequence thereof the weight on belt 82 is allowed to descend by gravity, driving back wheel 80 and slide-piece 18 to their normal position toward the right.

It has been mentioned heretofore that when using a perforated strip for composing the endless line it is not necessary to provide on the strip perforations for hyphen-types between each two syllables, but that it should in general suffice to leave pairs of consecutive short syllables. One can go further in this respect when the endless line will be composed by an operator at a keyboard or by hand. The ending of an individual line being marked in my apparatus by the approach of the beginning of the endless line to lever 56 the operator is always enabled by locking to the assembling-channel to defer the setting of hyphen-types to the time they are required and to stop the setting of such types when they are superfluous. He will therefore in order to economize time not begin setting hyphen-types before the endless line approaches lever 56 and will stop the insertion of hyphen-types as soon as the line reaches this lever, which event could be indicated by the usual bell-signal.

I will now describe the means for detaching individual lines of shorter length which occur in ending paragraphs. When composing by means of a perforated strip, the end of such a line is to be marked by a separate hole combination supplying an end type 92, Fig. 1, provided with a larger pin projection than the spaces and the hyphen-types as to project from the line beyond the spaces and hyphens. The said end type is controlled by a special key when setting by means of a keyboard. As the corresponding individual line must be detached after the end type, slide-piece 17 is to be released as soon as an end type passes by the hooks 47 48. For this purpose two levers 94 95 are mounted on a spindle 93, journaled in channel-wall 1, and two rollers 96 97 are provided at the ends of the said levers entering in close proximity of hooks 47 48 the path of the most projecting end types, but not that of the space nor of the hyphen-types. Another lever 98 is fixed to spindle 93, bearing against a stud 99 of lever 54. By these means lever 54 is actuated and slide-piece 17 deprived of its support and released whenever an end type passes rollers 96 97 and strikes the lever system 94 95 98. In order to uniformly actuate stud 99 by lever 98 in whatever position plate 55 has been adjusted, the working edge 100 of lever 98 assumes a parallel position with respect to the channel-wall, thus being always in contact with stud 99. Lever 98 is kept in its normal position by lever 54 and by the above-mentioned spring coiled on the latter. When slide-piece 17 performs its stroke, hooks 47 48 pass by the rollers 96 97, which leaves a sufficient space for the passage of the hooks while the ejecting device is stopped, as heretofore described, on the passage of the end type grasped by the hooks and thus retained in the line. In order to carry the individual lines into the galley, all types projecting from the bottom of the assembling-channel must be raised before entering the galley, as they would otherwise strike against its bottom. This is effected by a spring-actuated lever 102 103, Fig. 1, pivoted to the bottom plate of the galley and oscillated by a very rapidly revolving eccentric disk 104 of very slight eccentricity. As the projecting types pass the tapering end 105 of the said lever they will be quickly and yet successively raised, the raising of the adjacent types being prevented by the rapidity of the oscillations or by friction between the types and the channel-walls.

In Figs. 6 to 23, inclusive, I have represented modifications of my invention. In the modification represented in Fig. 6 the hyphen-types are removed from the line by a pusher 108, which is oscillated by means of a spring-actuated lever 107 and rapidly-revolving eccentric disk 106. Pusher 108 is pivoted to the lever 107 and by a spring 109 is drawn toward the line and at the same time kept in contact with a roller 110. The forked end of said pusher extends across slide-piece 18 and channel-wall 2 and is reciprocated across the path of the projecting of the hyphen-types. By these means a hyphen-type passing by the pusher will be forced from the line into a slot 111 of channel-wall 1, wherefrom it drops by gravity. As the pusher is pivoted to lever 107, the endless line is allowed to proceed without trouble during the removal of a hyphen-type, and this may be further facilitated by making the slot 111 of the form represented in Fig. 7 and giving the hyphen-type 112 a correspondingly-shaped body. As the slot is enlarged at its ends and the type recessed at 113, the type can be ejected without trouble during its travel from the position indicated, Fig. 7, (left hand,) to that indicated, Fig. 7, (right hand,) without enlarging the slot throughout its length, which might cause thin character-types adjacent to the hyphen-types to be wrongly ejected with the latter. In order to stop the action of pusher 108 on the passage of hooks 47 48, an abutment 114 is attached to slide-piece 17, so as to enter the path of a projection 115 of the pusher and intercepting the same at the proper time.

In the modifications represented in Figs. 8 to 17, inclusive, the hyphen-types are ejected longitudinally from above or from below. In the modification represented in Fig. 8 (which is a side view corresponding to Fig. 1) a pusher 119 is pivoted to a spring-actuated lever 116 and oscillated by a rapidly-revolving eccentric disk 120. The pusher is actuated by the spring 117 toward the line and at the same time kept in contact with a roller 118. When the line passes underneath the pusher, the projecting types are struck, and as the spaces c, Fig. 10, and the end types d, Fig. 10, are prevented by their rectangular body from leaving the line through the slotted bottom 4 5 of the assembling-channel only the cylindrical hyphen-types e will be ejected by the pusher. A rail 123, extending beneath slot 3, prevents the hyphen-types dropping out of the assembling-channel before reaching the proper ejecting-point, and strips 126 127 are provided at the upper edges of channel-walls 1 2, Fig. 9, in order to guide them in an upright vertical position. The upper reduced portions of the spaces c and types d, Fig. 10, are lengthened and the bodies shortened in order to permit these types to be raised, as required, to the bottom level of the galley. An abutment 124 is provided or a slide-piece 17 for intercepting pusher 119 by means of its stud 125 at proper times and stopping its action for the purpose mentioned. The object of having the recess f, Fig. 10 and likewise Fig. 14, in the body of the end types d d' will be explained in the following description with respect to Figs. 15 to 17: When using a strong spring 117, hyphen-types are forced out of the assembling-channel by the simple stroke of the pusher. However, I prefer to use a slight spring depressing only the hyphen-types, so that they enter between a pair of rapidly-revolving friction-rollers 121 122, Fig. 9, and then are fully withdrawn by the action of these rollers. In the modification represented in Fig. 11 the hyphen-types e' are shaped as shown in side view in Fig. 12 and ejected out of the assembling-channel from below. The ejecting device being of the same construction as described with reference to Fig. 8, similar parts have been indicated by similar indexed numerals, a further description not being deemed necessary. As the lower reduced portion of the hyphen-types e' projects beyond the spaces c' and the end types d', Fig. 14, the latter are not struck by the reciprocating pusher, while the hyphen-types raised by the pusher enter between and are withdrawn by the rapidly-revolving friction-rollers 121' 122'. In order to prevent any adjacent character-type from being wrongly withdrawn by friction, channel-wall 1, Fig. 12, is provided on its inner side with a rib 128 and the type characters guided thereon by a nick, while the recessed hyphen-type, Fig. 12, is not retained by rib 128. The types withdrawn by rollers 121' 122' enter between tapes 129 130, Fig. 13, provided above the rollers, and are carried upward by the tapes until they are delivered at their upper end and tilted, as indicated by an arrow, so as to lie flat and descend by gravity in a channel 131, from which they may be delivered to an assembling-box or an assembling-channel.

In Figs. 15 to 17, inclusive, corresponding, respectively, to Figs. 1 to 3, I have represented a complete apparatus of my invention provided with an ejecting device of the kind described heretofore with reference to Fig. 8 and with a modified arrangement for detaching short lines ending a paragraph, the latter arrangement corresponding to the modified shape of the end types d d', Figs. 10 and 14. So far as the feature of my invention represented in Figs. 15 to 17 corresponds to Figs. 1 to 3 and to Fig. 8 similar parts are indicated by similar numerals, and the working of these parts is the same as described with reference to the said figures. It will therefore suffice to describe the arrangement and the working of the said modified part of the invention. In this modification the spindle carrying the levers 54 and 56, as heretofore described, is further provided with a lever 132 and actuated by a spring 133, a projection 134 of lever fixing the normal position of the said lever system. A lever 135, pivoted to the framework, is loosely connected to lever 132 by a rod 136, and a pin 137, projecting from lever 135, enters a recess 138 in a spring-actuated pusher 140 while oscillated by the fast-revolving eccentric disk 139 and guided at one end on the shaft of this disk and at the other end 141 in an opening in channel-wall 1. Pusher 140 is forced toward the assembling-channel by a spring 142, and the recess 138 of the pusher gives play to the pin 137 in such manner that lever 135 is free to perform its stroke whenever actuated from lever 56 by rod 136, and, on the other hand, lever 135 will not be actuated by the stroke of pusher 140 unless such stroke surpasses a certain extent. Slide-piece 17 is provided with an opening 143, Fig. 15, so that its movement will not be obstructed by pusher 140. The end types, Figs. 10 and 14, are deeply recessed at $f$ and pass with this recess by the reduced pusher end 141 when proceeding with the line. As the pusher continuously and rapidly oscillates it enters recess $f$ and performs a large stroke, surpassing the above-mentioned extent, so as to actuate lever 135 by means of pin 137 whenever an end type passes by the pusher end, while on the passing by of a character-type (not recessed) or a hyphen-type $e$, Fig. 9, receding but slightly behind the character-types, but a comparatively short stroke can be performed by pusher 140, and lever 135 will not be actuated. The stroke of lever 135 being transferred by rod 136 to levers 132 and 54, the latter releases the abutment 51 52 on arm 43 of slide-piece 17, which therefore begins its stroke toward the left. At the same time hooks 47 48 enter the endless line, grasping the end type and detaching the individual line after that end type, as required in an ending line of a paragraph. The detaching of individual lines of full length is performed, as heretofore described, by means of lever 56, not modified whenever the endless line reaches the said lever. Holes 145 are provided at the left-hand end of rod 136, corresponding to the above-mentioned screw-holes 75 76 of arm 43 and channel-wall 1, for the purpose of varying the distance between levers 132 and 135 when adjusting the apparatus for different lengths of lines. In order to prevent the hyphen-types from accidentally dropping out of the assembling-channel, strips 146 147 are provided underneath slot 3, extending from either side of the rollers 121 122. The latter are mounted on fast-revolving shafts journaled in bearings 148 149 150, and motion is imparted to the said shafts by means of pulleys 151. A funnel 152, Fig. 17, is provided beneath rollers 121 122 to receive the ejected hyphen-types and to deliver them to an assembling-receptacle.

Figs. 18 to 23 represent modifications of the apparatus heretofore described, showing also means for measuring the length of the individual detached lines and registering the number of spaces contained therein with respect to a justifying device to be conveniently combined with my apparatus. Figs. 18 and 19 are respectively a side view and a top view corresponding to Figs. 1 and 2 or Figs. 15 and 16, Figs. 20 and 21 sectional views on lines $xx$ and $yy$ of Fig. 19, respectively seen from the right, and Figs. 22 and 23, respectively, a rear view and a sectional view on line $zz$ of Fig. 18 of a detail hereinafter fully explained. The slide-piece 17' for detaching individual lines is guided on rods 153 154, carrying on a spindle 155 spring-actuated levers 44' 44", which are provided with grasping projections 47' 48'. In the normal position of slide-piece 17' represented in the drawings projections 47' 48' are withdrawn from the line by a stop-pin 156. Slide-piece 17' is actuated toward the left by a weight 158, attached thereto by means of a cord 157 or by a spring and locked against the strain thereof by a two-armed catch-lever 159 160, bearing with a lateral projection 161 against an abutment 162 on the slide-piece. Another cord 163 is connected to the latter and wound on a cord-pulley 80', loosely mounted on a revolving shaft 83', the latter having a ratchet-wheel 84' fixed thereto. Pulley 80' is provided with a three-armed pawl-lever 85' 87', controlled by a spring-piece 88' 89' in the same manner as described with ratchet-wheel 84' in the position of slide-piece 17' represented in the drawings. If abutment 162 is released from the catch-lever arm 159, slide-piece 17' will be drawn toward the left and the grasping ends 47' 48' of levers 44' 44" enter the line, detaching and carrying along a portion of the line. As slide-piece 17' performs its stroke toward the left pulley 80' is carried around by cord 163 and stopped, together with the slide-piece, by lever-arm 86', finally striking against the portion A' of the frame-plate A, and thereby causing 85' to engage with the ratchet-wheel. Pulley 80' is therefore turned in the opposite direction and slide-piece 17' carried back toward the right to its normal position until lever-arm 86' strikes the opposite portion A" of frame-plate A, thereby again releasing pawl 85' from the ratchet-wheel. At the same time projection 161 of catch-lever 159 catches the abutment 162 of the slide-piece, locking the same against the pull of the weight. Slide-piece 17' is released to perform its stroke by the following means: A support 167 is guided on rods 153 154, actuated toward the right by a weight 166 and cord 165 or by a spring and provided with a hook-shaped spring-actuated supporting-lever 164, entering the assembling-channel through a slot of wall 1 and bearing the free end of the proceeding endless line. Lever 164 is caught against the pressure of its spring 179 by a spring-actuated catch-lever 181 182 and support 167, provided with a stud 168, being upon the level of a roller 169, mounted on the end of lever-arm 160 of the above-mentioned catch-lever 159 160. As support 167 proceeds with the increasing line roller 169 will be struck upward, and thereby abutment 162 of slide-piece 17' released from the catch-lever arm 159 by the passing of stud 168 underneath roller 169. By these means a corresponding portion of the endless line will be detached. In order to detach a portion of a predetermined length, (as required with respect to the given definitive length of the line after justification,) stud 168 can be adjusted by means of a set of holes 170, provided in the body of support 167. Slide-piece 18' is controlled by weight 176 and a cord 175 or by a spring and by a cord 177 passing on a cord-pulley 80", provided with a three-armed pawl-lever 85" 86" 87" and a spring-piece 88" 89" and by a ratchet-wheel 84", mounted on shaft 85', as described with respect to slide-piece 17'. In its normal position slide-piece 18' is caught against the pull of weight 176 by a catch 174 of a two-armed catch-lever 172 173. It is released from the said catch to perform its stroke toward the left by a pin 171 of slide-piece 17' striking against lever-arm 172. This takes place when the detached line has been shifted by the slide-piece 17' toward the left beyond the end of spring-pawl 79", slide-piece 17' then returning to its normal position and the line being forwarded and delivered to the galley by pawl 79" during the left-hand stroke of slide-piece 18'. It may be observed that instead of connecting slide-piece 17' to pulley 80' and slide-piece 18' to pulley by means of cords 163 177, as represented in the drawings, any other convenient connecting means may be made use of—as, for instance, a gearing—by providing the pulleys with teeth and fixing toothed racks to the slide-pieces to mesh with the gear-pulleys. For reasons hereinafter explained the line will be stopped before entering the galley, and this is effected by an abutment 204 temporarily entering the assembling-channel and locked in its position. Until reaching the said abutment the line bears against the supporting-lever 164 of the support 167, traveling along with the same. The latter then having performed its function is to be restored to its normal position to serve again as a support for the proceeding endless line and to control the detaching of a new line portion. This is effected by a stop-pin 183, by striking against which lever-arm 182 of the catch-lever 181 182 is thrown out of position against the pressure of spring 180, thus releasing lever-arm 164, which is thrown out of the path of the line by the spring 179. Support 167 thus being released is carried back toward the right to its normal position by the pull of weight 166, and in reaching the same lever-arm 178 strikes against a stop-pin 184, so as to enter again the line and to allow catch-lever 181 to assume again its locking position in order to catch lever 164. The abutment 204, being adjustable for reasons hereinafter explained with respect to the predetermined length of line, stop-pin 183 can accordingly be adjusted by means of a set of holes 183'. The ejecting device for the hyphen-types consists of a spring-actuated slide 20', guided on the frame-piece 19' and provided with levers 26' 27', the hyphen-types being pulled out of line through a slot 185 of wall 2 by means of the hook-shaped ends of the levers. The slide is held against the pressure of its spring 24' by catches 29' 29" of lever-arms 28' 28", which engage teeth 33' 33" on piece 19', and is released by the pin projections of the hyphen-types, as heretofore described. Slide 20' is restored to its locked position by means of a spring-actuated friction-roller 186, eccentrically pivoted to the slide-body, and by a friction-disk 189, mounted on a revolving shaft 190, the latter passing through a slot 191 of slide 20'. The latter having been released and performing its stroke, roller 186 will be brought into frictional contact with disk 189 and carried around by friction; but in consequence of its being eccentrically pivoted slide 20' at the same time is shifted toward its normal position, the catch ends 29' 29" of levers 28' 28" passing thereby beyond teeth 33' 33". Roller 186 thus having performed half a revolution, slide 20' begins again to recede, but will be immediately caught by the teeth 33' 33", no friction being further developed between roller 186 and disk 189; but as roller 186 then necessarily has been carried around beyond half a revolution spring 188 assumes a working position, with the effect to complete the revolution of roller 186, thus being restored to its initial position and ready to perform its function the next time. The ejecting device must be made inoperative, as heretofore explained, by passing of a hyphen-type grasped by the lever projections 47' 48'. In the present modification this is directly effected by the levers 44' 44", the free ends thereof traveling in the path of the hook ends of levers 26' 27' and striking the latter before the grasped hyphen-type enters the recesses of the said levers. Slide 20' being released, the levers perform their stroke without pulling out the hyphen-type.

It may be desirable to combine my apparatus with a justifying device, as the detached lines necessarily must be afterward justified, and, on the other hand, the final object of my invention is to detach from an endless line individual line portions susceptible of being afterward justified. With that view it is of importance to control the length of each detached line portion and to register the number of provisional spaces contained therein in order to properly adjust the main parts of the justifying apparatus and enable the same to perform the justifying of each individual line. I have therefore provided in the present modification of my invention means for controlling the length of each line portion and for registering the number of provisional spaces contained in such a line portion. For the latter purpose I have provided a spring-actuated slide 20', guided on the frame-piece 19' and carrying feeler-levers 26' 27', which are furnished with catch-lever extensions 28' 29' 28" 29", adapted to be caught by teeth 33' 33", substantially as shown and described with respect to the ejecting device for the hyphen-types. However, in the present instance the function of the feeler-levers is not to act upon the spaces, but, on the contrary, to be actuated by the spaces for the purpose of releasing slide-piece 20' as each space passes thereby. Levers 26' 27' are provided, respectively, with projecting plates 192 193, which enter the path of the pin projections of the spaces, and to slide 20' are fixed stop-pieces with knife-edges 194 195, the latter forming prolongations of the said plates in the unlocked position of levers 26' 27'. By these means levers 26' 27' when struck by a space reaching plates 192 193 will release slide 20', which will make its stroke toward the assembling-channel. The pin projections of the space will be thereby released from plates 192 193, but immediately intercepted by the knife-edges 194 195, while the levers 26' 27' are immediately restored by their springs to their position toward the right. As slide 20' is driven back plates 192 193 pass freely on the right of the pin projections, which are still supported on the left by the knife-edges 194 195, the line thus being prevented from proceeding a step unless plates 192 193 enter the path of the pin projections of the spaces and assume their working position with respect to the next following space. The described means are somewhat similar to the well-known type-writer escapement. Slide 20' is driven back to its normal position by the same means as described and shown with respect to slide 20'— i. e., by a friction-roller 186', a spring 188', controlling the same, and a friction-disk 189' on shaft 190, passing through a slot 191' of slide 20'. By the passing of a line portion slide 20', therefore, will perform as many strokes as there are word-spaces in a line, or, properly speaking, one stroke too many, as there is a space-type or a hyphen-type at the end of each line portion. However, this being the case for each line, no inconvenience will be involved therein with respect to the justifying apparatus, to which the strokes of slide 20' are transferred by any convenient means. The length of the individual line portions is controlled as follows: A slide-piece 197, guided in the assembling-channel and by a projection 197' in a slot 196 of channel-wall 2, is loosely connected by a screw 198 to a rod 200, fixed to slide-piece 18', the upper enlarged portion of the screw-shaft passing through a slot 199 of the rod, as shown in Figs. 18, 19, and 22, rear view from the left-hand end of Fig. 18. Slide-piece 197, whenever shifted toward the left, thus will be brought to its normal position (indicated in the drawings) by slide-piece 18' when the latter assumes its normal position, and is temporarily locked in that position against moving toward the left by a bar 201, Figs. 19 and 20, guided in the frame portion B and controlled by a forked lever 206, mounted on a square rod 207. A plate 203, Figs. 18, 19, and 23, provided with an angular abutment 204 and connected to a guide-plate 202, can be fastened to slide-piece 197 by means of the shouldered portion of the above-mentioned screw 198 and adjusted thereto, according to the predetermined length of line, by means of a set of screw-holes 205, Fig. 18, provided in the combined parts 202 203. Rod 207 is journaled in a support of the frame portion B and in a support C and carries two adjustable tappets 208 209, provided with inclined and oppositely-projecting ribs 210 211, the latter being alternately struck by a roller 212 of slide-piece 17' in such a manner that during the travel of slide-piece 17' toward the left tappet 208 will be struck from below and rod 207 accordingly turned and bar 201 shifted into its locking position, so as to intercept slide-piece 197 from the left, while during the travel of slide-piece 17' toward the right tappet 209 is struck from above and slide-piece 197 released from the locking-bar. By these means a line portion having been detached by slide-piece 17' is carried into the reach of pawl 79". If the latter performs its stroke to the left, it will be stopped, together with the line, by the abutment 204. The line thus bearing against the latter, the above-mentioned supporting-lever 164 of support 167 is disengaged from the line, as heretofore described, and the line is kept stationary for a time, and as all the successively-detached line portions thereby assume a position in which their left-hand ends rest at one and the same point of the assembling-channel (abutment 204 being an invariable stop) they can obviously be measured as to length from the right. This is effected by a spring-actuated slide-piece or a lever 214, Figs. 18 and 19, permanently kept in contact with a stud 213 of slide-piece 18'. During the standstill period of each line lever 214 is therefore adjusted in accordance with its length, and the corresponding stroke of the lever is transferred by any convenient means to the justifying apparatus thus controlled by the individual line portions. In the meanwhile slide-piece 17' performs its travel toward the right, disengaging abutment 204 by its roller 212 and the tappet 209, and the line is now forwarded and delivered to the galley until slide-piece 18' reaches its extreme left-hand position. As now slide-piece 18' begins its travel toward the right by the means heretofore described abutment 204 will remain stationary for a time by reason of its slot connection with rod 200, allowing thus of shifting the line upward or sideward out of the way of the abutment on its travel toward the right and is then carried along with slide-piece 18' until both reach their normal right-hand positions. In the meanwhile the endless line proceeds in the assembling-channel, causing all parts of the apparatus to work again in the described succession and manner. Abutment 204 is recessed at 215, Fig. 23, in order to allow of supporting-lever 164 passing through and being disengaged just as the line reaches the abutment.

Having now particularly described and ascertained the nature of this invention and in what manner the same is to be performed, I declare that what I claim is—

1. A composed continuous line comprising character-types, provisional hyphen-types, and provisional space-types, said character, hyphen and space types differing from each other in form or dimensions for the purpose set forth.

2. A composed continuous line comprising character-types, provisional hyphen-types, provisional space-types, and end types to indicate the termination of paragraphs, said character, hyphen, space and paragraph types differing from each other in form or dimensions, for the purpose set forth.

3. The combination with a suitable channel and a continuous line therein comprising character-types, provisional spaces, and provisional hyphen-types, of automatic means for separating said continuous line into individual lines of approximately uniform length, for the purpose set forth.

4. The combination with a suitable channel and a continuous line therein comprising character-types, provisional spaces, and provisional hyphen-types, of automatic means for separating said continuous line into individual lines of approximately uniform length and automatic means for withdrawing the hyphen-types, excepting the final one when an individual line ends in a hyphen, for the purpose set forth.

5. An apparatus for forming provisional individual line portions of types or matrices from a continuous line, consisting of an assembling-channel for the continuous line, an ejecting device for ejecting hyphen-types from the continuous line, means for actuating the ejecting device, a slide-piece for detaching individual line portions from the continuous line provided with a gripper, means for reciprocating the said slide-piece, another slide-piece for receiving the detached line portion and delivering the same to a galley, means for reciprocating the latter slide-piece, and means for temporarily suspending the action of the ejecting device, substantially as and for the purposes described.

6. An apparatus for forming provisional individual lines of types or matrices from a continuous line, consisting of an assembling-channel for the continuous line, an ejecting device for ejecting hyphen-types from the continuous line, means for actuating the ejecting device, a slide-piece for detaching individual line portions from the continuous line provided with a gripper, means for reciprocating the said slide-piece, another slide-piece for receiving the detached line portion and delivering the same to a galley, means for reciprocating the latter slide-piece, means for temporarily suspending the action of the ejecting device, and a space-registering device intermittingly reciprocated by the spaces of the detached line portion, substantially as and for the purposes described.

7. An apparatus for forming provisional individual line portions of types or matrices from a continuous line, consisting of an assembling-channel for the continuous line, an ejecting device for ejecting hyphen-types from the continuous line, means for actuating the ejecting device, a slide-piece for detaching individual line portions from the continuous line provided with a gripper, means for reciprocating the said slide-piece, another slide-piece for receiving the detached line portion and delivering the same to a galley, means for reciprocating the latter slide-piece, means for temporarily suspending the action of the ejecting device, and a line-measuring device controlled by an abutment for temporarily stopping the detached line portion, substantially as and for the purposes described.

8. In an apparatus for detaching provisional individual line portions of types or matrices from a continuous line contained in an assembling-channel and provided with provisional hyphen-types, an ejecting device for the hyphen-types, consisting of a spring-actuated slide, means for locking the slide, a lever or levers pivoted to the same and entering the path of projections of the hyphen-types projecting from the continuous line, a stop provided at the end of the lever or levers, means for releasing the slide by the lever action, a slot provided in the wall of the assembling-channel opposite to the spring-actuated slide, and means for temporarily rendering said lever or levers inoperative, substantially as and for the purposes described.

9. In an apparatus for detaching provisional individual line portions of types or matrices from a continuous line contained in an assembling-channel and provided with provisional hyphen-types, an ejecting device for the hyphen-types, consisting of a spring-actuated slide, means for locking the slide, a hooked lever or levers pivoted to the same and entering the path of projections of the hyphen-types projecting from the continuous line, means for releasing the slide by the lever action, a slot provided in the wall of the assembling-channel, opposite to the spring-actuated slide, and means for temporarily rendering said hooked lever or levers inoperative to permit a hyphen-type to pass, substantially as and for the purposes described.

10. The combination with a channel, and a line therein comprising character-types, and hyphen-types having projecting portions of a device movable transversely to said channel and adapted to engage the projecting portions of the hyphen-types, means for moving said device, and an opening in the channel-wall through which the hyphen-types may be ejected from the line, substantially as described.

11. The combination with the channel, and a line therein comprising character-types, and hyphen-types having portions projecting above and below the channel, of a spring-actuated part having members located above and below the channel in the path of the hyphen-type projections, and means for moving said members transversely to the channel at suitable intervals to withdraw the hyphen-types, substantially as described.

12. The combination with a channel, and a line movable therein comprising character-types, space-types and projecting portions, of a space-register device comprising a slide movable transversely to the channel, a spring for moving said slide in one direction, means for locking the slide against the action of the spring, means operated by the space-types for releasing the slide, and means for restoring the spring to its initial position, whereby said slide is caused to move one complete reciprocation each time a space-type passes it, substantially as described.

13. The combination with a channel, and a line movable therein comprising character-types, and space-types having portions projecting above and below the channel, of a slide reciprocating transversely to the channel, levers carried by the slide and having their ends normally in the path of the projections of the space-type, and means for causing said slide to make a complete reciprocation each time a space-type comes in contact with said levers, substantially as described.

14. In an apparatus for forming provisional individual line portions of types or matrices from a continuous line contained in an assembling-channel, the combination of a slide-piece for detaching portions from the continuous line, a slide-piece for receiving the detached line portion and delivering the same to a galley, an adjustable abutment entering the assembling-channel, means for adjusting the said abutment relatively to the line receiving and delivering slide-piece, and means for temporarily locking the abutment in its adjusted position, substantially as and for the purposes described.

15. In an apparatus for automatically detaching individual lines from a moving continuous line, a device movable in front of the continuous line, and means for parting said line to separate an individual line, the action of the parting means being controlled by the advance of said device, substantially as described.

16. The combination with a channel for holding and guiding a moving continuous line of a slide movable adjacent to the channel and adapted to be carried forward by the advancing end of the line, and means governed by said slide for separating the continuous line into individual lines of approximately equal length.

17. The combination with a channel for moving a continuous line, of a line-detaching device comprising a slide, a lever pivoted to the slide and adapted to enter the line, means for retracting the slide and holding the lever out of the channel, and means governed by the advancing line for releasing the slide and permitting the lever to enter the line, whereby a portion of the line is detached and carried forward toward a galley, substantially as described.

18. The combination with the channel of a continuous line, the slide adjacent to the channel, the line-detaching levers carried by said slide, means for locking the slide in its rearmost position, means governed by the advancing line for releasing said slide, a weight or equivalent device for carrying said slide forward, and power-driven mechanism adapted to automatically engage and return said slide to its initial position.

19. In a machine of the class described, a channel for a continuous line, a slide having a hook or pawl adapted to be engaged and forwarded by the advancing line, a second slide provided with line-detaching levers constructed to detach and forward a portion of the continuous line, and a third slide arranged to subsequently engage said detached portion and forward it to a galley, substantially as described.

20. In an apparatus for detaching provisional individual lines of types or matrices from a continuous line contained in an assembling-channel, the combination of a slide-piece for detaching portions from the continuous line, a slide-piece for receiving the detached line portion and delivering the same to a galley, a toothed wheel loosely mounted on a revolving shaft and meshing with the line receiving and delivering slide, a ratchet-wheel fixed to the revolving shaft, a pawl pivoted to the said toothed wheel, means for alternately engaging the pawl with and disengaging the same from the ratchet-wheel, and means for shifting the line-receiving slide to its normal position, substantially as and for the purposes described.

In testimony whereof I have hereunto set my hand in presence of two subscribing witnesses.

HUBERT BURG.

Witnesses:
 EDOUARD THOMAS,
 ERNEST THERION.